US 9,911,991 B2

(12) United States Patent
Park et al.

(10) Patent No.: US 9,911,991 B2
(45) Date of Patent: Mar. 6, 2018

(54) AIR SHUT-OFF VALVE APPARATUS FOR FUEL CELL SYSTEM

(71) Applicants: Hyundai Motor Company, Seoul (KR); KIA Motors Corporation, Seoul (KR); Dong Hee Industrial Co., Ltd., Ulsan (KR)

(72) Inventors: Jeong Hee Park, Suwon-si (KR); Chang Ha Lee, Yongin-si (KR); Eul Ho Son, Gyeongsangnam-do (KR); Jae Hwan Seo, Ulsan (KR)

(73) Assignees: HYUNDAI MOTOR COMPANY, Seoul (KR); KIA MOTORS CORPORATION, Seoul (KR); DONG HEE INDUSTRIAL CO., LTD., Ulsan (KR)

( * ) Notice: Subject to any disclaimer, the term of this patent is extended or adjusted under 35 U.S.C. 154(b) by 68 days.

(21) Appl. No.: 15/064,225

(22) Filed: Mar. 8, 2016

(65) Prior Publication Data
US 2017/0244117 A1    Aug. 24, 2017

(30) Foreign Application Priority Data
Feb. 18, 2016    (KR) .................. 10-2016-0019048

(51) Int. Cl.
*F16K 1/22*    (2006.01)
*H01M 8/04082*    (2016.01)
(Continued)

(52) U.S. Cl.
CPC ....... *H01M 8/04201* (2013.01); *F16K 1/2007* (2013.01); *F16K 1/2021* (2013.01);
(Continued)

(58) Field of Classification Search
CPC ......... H01M 8/04201; H01M 8/04288; H01M 2250/20; F16K 1/20; F16K 1/22;
(Continued)

(56) References Cited

U.S. PATENT DOCUMENTS 3,861,646 A * 1/1975 Douglas ............ B29C 45/14344
251/332
6,135,415 A * 10/2000 Kloda .................... F02M 26/70
123/568.18
(Continued)

FOREIGN PATENT DOCUMENTS

DE    3501827 A1    9/1985
DE    10215913 C1    10/2003
(Continued)

OTHER PUBLICATIONS

European Search Report corresponding to European Patent Application No. 16163116.3 dated Sep. 14, 2016, 8 pages.
(Continued)

*Primary Examiner* — Matthew W Jellett
(74) *Attorney, Agent, or Firm* — Brinks Gilson & Lione

(57) ABSTRACT

Disclosed herein is an air shut-off valve for a fuel cell system that can completely close an air passage (11) communicating with a cathode of a fuel cell stack, even though a butterfly-type valve is employed, upon the halt of operation of the fuel cell system, thereby greatly improving the durability of the fuel cell stack.

12 Claims, 8 Drawing Sheets

(51) Int. Cl.
*H01M 8/04228* (2016.01)
*F16K 31/04* (2006.01)
*H01M 8/04089* (2016.01)
*H01M 8/04223* (2016.01)
*F16K 1/20* (2006.01)
*H01M 8/04119* (2016.01)

(52) U.S. Cl.
CPC .............. *F16K 1/22* (2013.01); *F16K 31/043* (2013.01); *H01M 8/04089* (2013.01); *H01M 8/04223* (2013.01); *H01M 8/04228* (2016.02); *H01M 8/04149* (2013.01)

(58) Field of Classification Search
CPC ........ F16K 1/223; F16K 1/226; F16K 1/2261; F16K 1/2021; F16K 1/2042; F16K 1/205; F16K 1/18; F16K 11/052
USPC ......... 251/298, 299, 300, 364; 137/882, 883
See application file for complete search history.

(56) References Cited

U.S. PATENT DOCUMENTS

| | | | | |
|---|---|---|---|---|
| 6,622,986 | B2* | 9/2003 | Gagnon | .................. F16K 1/221 251/129.11 |
| 6,976,359 | B2* | 12/2005 | Hastings | ............... F02B 37/183 251/298 |
| 7,726,626 | B2* | 6/2010 | Akabane | ............. F24F 13/1426 251/129.11 |
| 8,499,557 | B2* | 8/2013 | Grabowska | ........... F01D 17/105 251/298 |
| 2002/0033194 | A1 | 3/2002 | Gagnon | |
| 2004/0224200 | A1* | 11/2004 | Ichikawa | .......... H01M 8/04089 429/444 |
| 2009/0208795 | A1 | 8/2009 | Skala et al. | |
| 2010/0003554 | A1* | 1/2010 | Haushaelter | ...... H01M 8/04037 429/406 |
| 2012/0264028 | A1* | 10/2012 | Skala | ..................... F16K 1/222 429/444 |
| 2013/0202979 | A1 | 8/2013 | Katano et al. | |
| 2014/0203202 | A1* | 7/2014 | Xu | .......................... F16J 15/04 251/315.01 |
| 2015/0068626 | A1 | 3/2015 | Bareis et al. | |

FOREIGN PATENT DOCUMENTS

| | | |
|---|---|---|
| DE | 102008035990 B4 | 2/2010 |
| DE | 102013021507 A1 | 6/2015 |
| JP | S50-128722 U | 10/1975 |
| JP | H02-094979 U | 7/1990 |
| JP | 2007317475 A | 12/2007 |
| JP | 2011-222356 | 11/2011 |
| JP | 5023743 B2 | 9/2012 |
| JP | 2016-122541 A | 7/2016 |
| KR | 10-2011-0079938 | 7/2011 |
| KR | 10-2012-0019764 | 3/2012 |
| KR | 10-2014-0073986 | 6/2014 |
| KR | 101534746 B1 | 7/2015 |

OTHER PUBLICATIONS

European Search Report for European Patent Application No. 17180460.2 dated Sep. 21, 2017; 9 pages.

* cited by examiner (Opened)

(Closed)

AIR SHUT-OFF VALVE APPARATUS FOR FUEL CELL SYSTEM

CROSS REFERENCE TO RELATED APPLICATION

The present application claims priority to Korean Patent Application No. 10-2016-0019048, filed Feb. 18, 2016, the entire contents of which is incorporated herein for all purposes by this reference.

BACKGROUND OF THE INVENTION

1. Field of the Invention

The present disclosure relates to an air shut-off valve apparatus for a fuel cell system. More particularly, the present disclosure relates to an air shut-off valve apparatus for a fuel cell system with which an air passage connected to a cathode of a fuel cell stack can be completely closed upon the halt of operation of a fuel cell system.

2. Description of the Related Art

A fuel cell system is a system for converting the chemical energy from hydrogen fuel and oxygen in the air into electricity through a chemical reaction, with the concomitant production of water. A fuel cell vehicle is a type of vehicle that uses the electricity from a fuel cell system to power its on-board electric motor.

Typically, a fuel cell system comprises a fuel cell stack, which generates electric energy and consists of a cathode (air electrode, oxygen electrode, reduction electrode) to which air is supplied, an anode (fuel electrode, hydrogen electrode, oxidation electrode) to which hydrogen is supplied, and an electrolyte membrane between the cathode and the anode.

After being drawn into a fuel cell system that is running, external air is humidified as it passes through a filter, a blower, and a membrane humidifier. The humidified air is then supplied to a cathode of the fuel cell stack.

Meanwhile, the hydrogen supplied to an anode of the fuel cell stack is dissociated into protons (H+) and electrons (e−) by a catalyst. Only the protons move through the electrolyte membrane to the cathode, while the electrons are drawn from the anode to the cathode through a gas diffusion layer and a separator plate, which are both conductive.

On the cathode, the protons and the electrons, which are supplied through the electrolyte membrane and the separator plate, respectively, react together with oxygen in the air to produce water, with the resultant generation of electricity owing to the flow of the electrons through an external circuit as the protons migrate.

When a fuel cell system is operated, therefore, the air that is humidified through a membrane humidifier is supplied to a cathode of a fuel cell stack, whereas the intake of humid air into the cathode should be blocked when the operation of the fuel cell system is halted. To this end, an air shut-off valve apparatus for controlling air intake is installed on the cathode side of the fuel cell stack.

In order to guarantee the durability of the fuel cell stack, an air shut-off valve apparatus, which is typically installed on each of the inlet and outlet sides of an air passage that communicates with the cathode, should completely block the inflow of humid air into the cathode upon the halt of the fuel cell system.

If the shut-off valve incompletely blocks the air passage communicating with the cathode when the fuel cell system is halted, humidified air continues to be introduced into the cathode, causing the corrosion and oxidation of a carbon support of the catalyst. As a result, the fuel cell stack deteriorates more rapidly, and thus decreases in durability.

In particular, the introduction of humid air into the cathode while the fuel cell system is halted may increase the circuit voltages of individual cells to such an extent as to damage the fuel cell stack, thus requiring that the start-up COD (cathode oxygen depletion), which is adapted to consume the increased voltage of individual cells upon start-up, be provided with increased capacity.

Moreover, such incomplete closure may lead to the introduction of foreign matter through the gap between the valve and the air passage.

The matters described as the background arts are only intended to increase the understanding of the background of the present invention, but should not be recognized as being prior arts which are already known to those skilled in the art.

SUMMARY OF THE INVENTION

Accordingly, the present disclosure has been made keeping in mind the above problems occurring in the related art, and an object of the present invention is to provide an air shut-off valve apparatus for a fuel cell system with which an air passage communicating with a cathode of a fuel cell stack can be completely closed, thus improving the durability of the fuel cell stack.

To address the above, the present disclosure provides an air shut-off valve apparatus for a fuel cell system, comprising: a valve body, in which an air passage communicates with a cathode of a fuel cell stack; and a valve flap, rotatably installed at the valve body, configured to open and close the air passage, wherein the valve body comprises a valve shaft that is axially rotatably installed at a position outside the air passage; and the valve flap is attached to the valve shaft at a position eccentric to the center of rotation of the valve shaft.

In a form of the present disclosure, the valve body may comprise a main body, at which the valve flap 20 is rotatably installed and which accounts for the external shape of the valve shut-off apparatus, and a sub-body, with which the valve flap is brought into contact when the air passage is closed by the valve flap and which is combined with the fuel cell stack in surface-contact.

In another form of the present disclosure, the sub-body may have a higher roughness than the main body.

In another form of the present disclosure, the sub-body may have a higher hardness than the main body.

In another form of the present disclosure, the main body may be die-cast from an aluminum alloy, and the sub-body may be made of stainless steel, or may be treated by hard anodizing if it is made of aluminum.

In another form of the present disclosure, the air passage may be divided into an inlet-side air passage and an outlet-side passage, both the inlet-side and the outlet-side passages being formed in one valve body, and a plurality of the valve flaps may be provided to cover the inlet-side air passage and the outlet-side air passage, respectively, and may be structured to open or close the inlet-side air passage and the outlet-side air passage at the same time.

In another form of the present disclosure, the air shut-off valve apparatus may further comprise: a valve motor installed in the main body; and valve gears through which the valve motor is connected to the valve shaft to transmit power of the valve motor to the valve shaft, wherein the valve shaft is axially rotatably mounted in the main body.

In another form of the present disclosure, the valve flap may be adapted to completely cover an end of the air passage, whereby the air passage is made airtight.

In another form of the present disclosure, the valve flap may comprise a valve plate, which is joined to the valve shaft, and a plate cover for covering the valve plate.

In another form of the present disclosure, the plate cover may be made of rubber so as to absorb noise and shocks upon contact with the sub-body and to improve the airtightness of the air passage.

In another form of the present disclosure, the air shut-off valve apparatus may further comprise a return spring, engaged at one end with the main body and at the other end with the valve shaft, for providing rotational torque for the valve shaft to move the valve flap in the direction in which the air passage is closed.

In another form of the present disclosure, the plate cover may have a cover projection incorporated thereinto, which comes into contact with a bulkhead forming the air passage in the sub-body, the cover projection may be brought into surface contact with the bulkhead in such a manner as to cover one end of the bulkhead, and an overlapping region may be provided between the cover projection and an end of the bulkhead so as to enhance the airtightness with which the air passage is closed by the valve flap.

In another form of the present disclosure, the valve shaft may be positioned such that the center of rotation of the valve shaft is aligned with an end line of the bulkhead along a vertical line, and the valve plate may be attached to the valve shaft at a position eccentric to the center of rotation.

In another form of the present disclosure, the valve flap may be eccentric to the center of rotation of the valve shaft by a distance equal to the projection length of the cover projection.

In another form of the present disclosure, the valve flap, when fully opened, may form an acute angle with respect to the closed state thereof.

In another form of the present disclosure, upon halt of operation of the fuel cell system, a closing force may be exerted for the valve flap to close the air passage, and simultaneously, a pressure difference may be formed between the inside and outside of the air passage closed by the valve flap.

In the present disclosure, the air shut-off apparatus can achieve complete airtightness of the air passage even though a butterfly-type valve is used, and thus has advantages over a solenoid-type valve in terms of the number of parts, weight, and production cost. In addition, the complete closure of the air passage prevents the introduction of humidified air and foreign matter into the cathode of the fuel cell stack, thereby reducing the required capacity of the start-up COD (cathode oxygen depletion) and greatly enhancing the durability of the fuel cell system.

BRIEF DESCRIPTION OF THE DRAWINGS

The above and other objects, features and advantages of the present disclosure will be more clearly understood from the following detailed description taken in conjunction with the accompanying drawings, in which.

DETAILED DESCRIPTION

Figure 1:
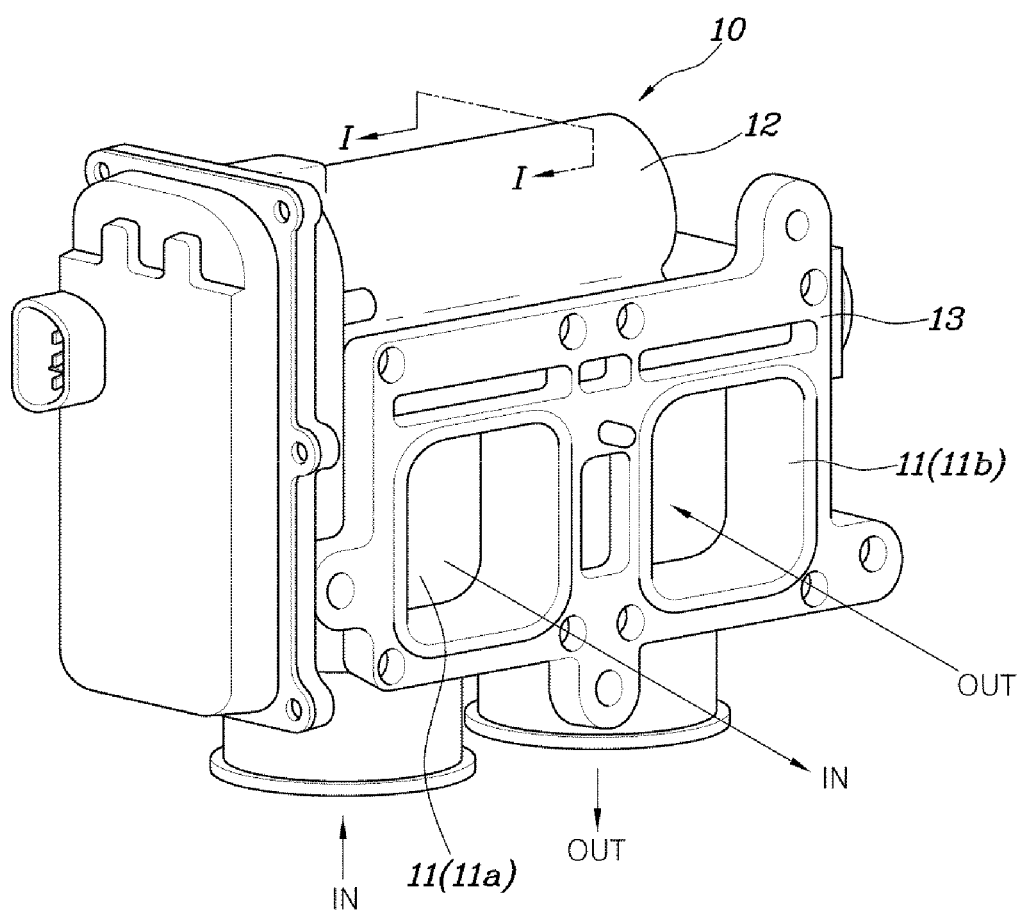
FIG. 1 is a perspective view of an air shut-off valve apparatus.
Figure 2:
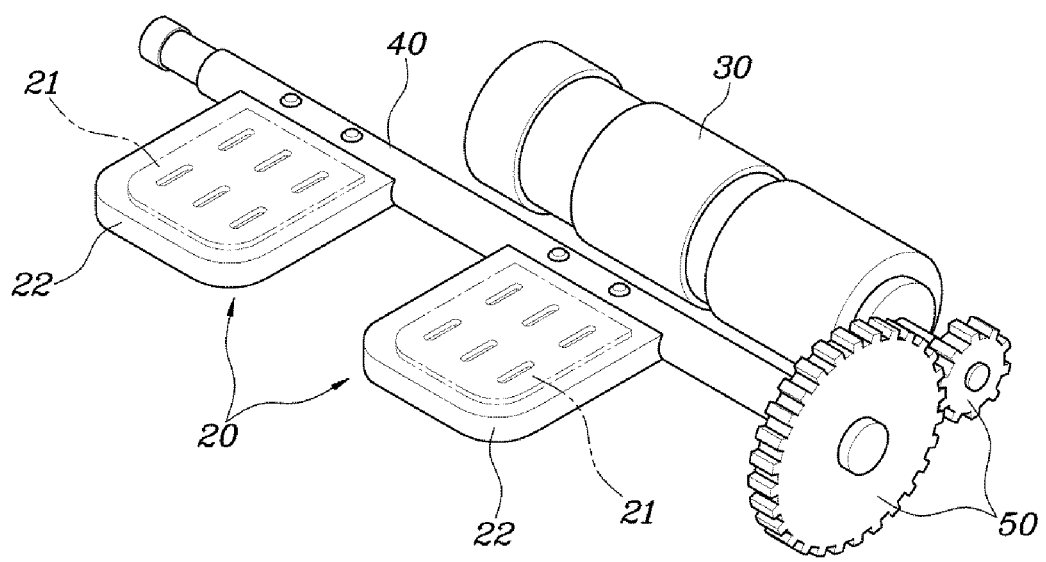
FIG. 2 is a view after a valve body is removed from the air shut-off apparatus of FIG. 1.
Figure 3:
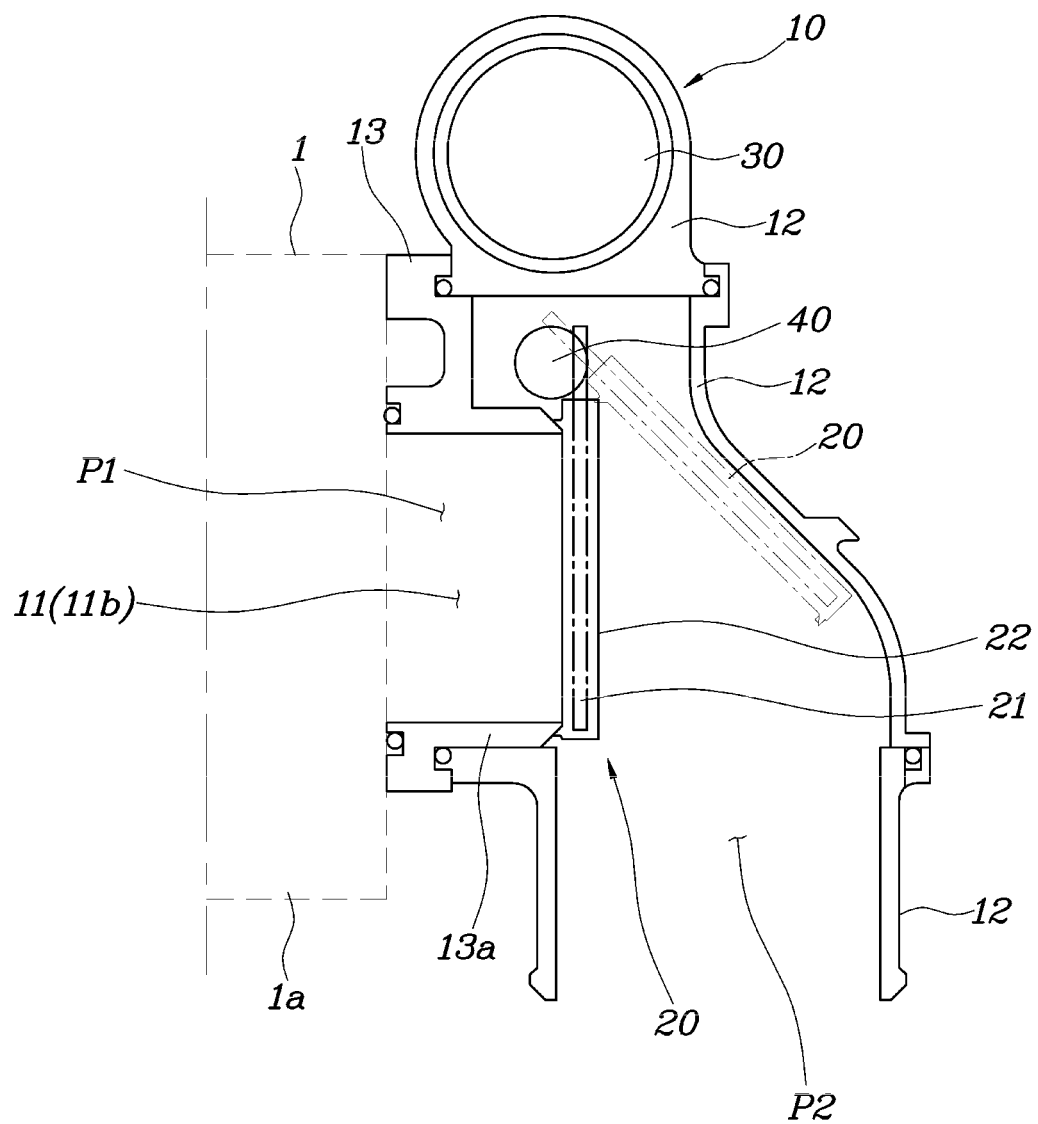
FIG. 3 is a cross-sectional view, taken along line I-I of FIG. 1.
Figure 4:
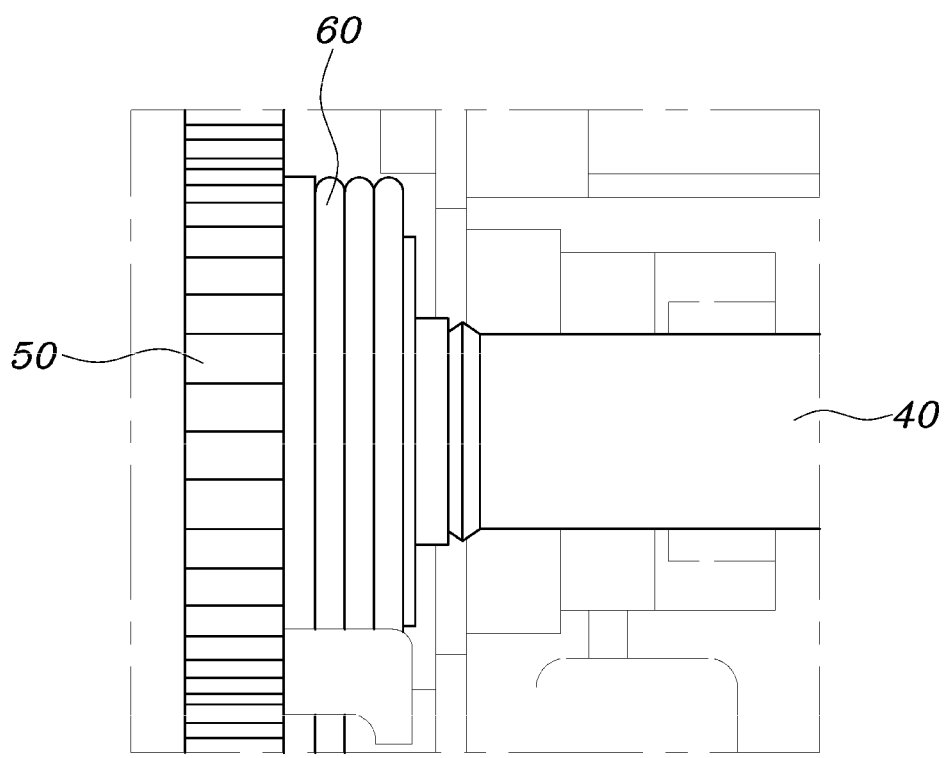
FIG. 4 is a view elucidating a return spring.
Figure 5:
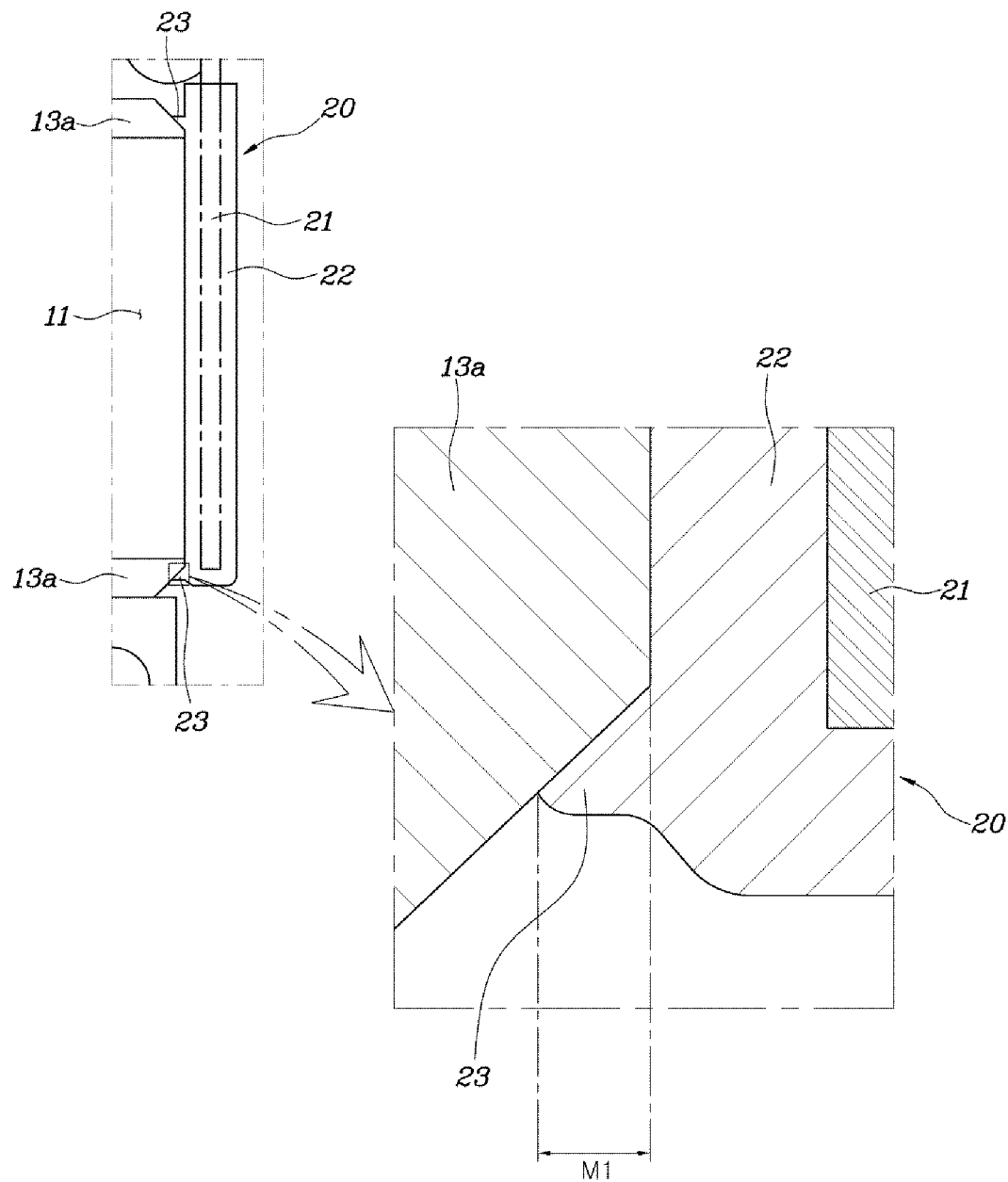
FIG. 5 is a view illustrating an overlapping structure of a valve flap and a sub-body.

Forms of an air shut-off valve apparatus for a fuel cell system will be described in detail with reference to the drawings.

Some forms of the present disclosure address an air shut-off valve for a fuel cell system, comprising, as shown in FIGS. 1 to 7, a valve body 10, in which an air passage 11 communicates with a cathode 1a of a fuel cell stack 1, and a valve flap, rotatably installed in the valve body 10, for opening and closing the air passage 11.

The air shut-off valve apparatus according to some forms of the present disclosure may be a butterfly-type valve, which has an advantage over a solenoid type in terms of cost.

The air passage 11 formed in the valve body 10 may be divided into an inlet-side air passage 11a, through which humidified, external air is introduced into the cathode 1a of the fuel cell stack 1, and an outlet-side air passage 11b, through which air is drawn from the cathodes 1a. The inlet-side air passage 11a and the outlet-side air passage 11b are formed together in a single valve body 10, whereby the number and overall size of the valve apparatuses as well as the production cost thereof can be reduced.

The inlet-side air passage 11a and the outlet-side air passage 11b may be positionally interchanged, unlike the positions shown in FIG. 1.

A plurality of the valve flaps 20 is provided to cover the inlet-side air passage 11a and the outlet-side air passage 11b, respectively. These plural valve flaps 20 are structured to open/close the inlet-side air passage 11a and the outlet-side air passage 11b at the same time.

The structure in which multiple valve flaps 20 simultaneously close/open the inlet-side air passage 11a and the outlet-side air passage 11b requires only one set, comprising a power source and a power train, from the power source to the valve flaps 20, thus reducing the number of parts, the weight of the apparatus, and the production cost thereof.

Given a structure in which the valve flaps for opening and closing the inlet-side air passage and the outlet-side air passage are actuated by respective power sources and power trains, the air shut-off apparatus suffers from the disadvantage of increases in the number of parts, weight, production cost, and final size. In order to address this shortcoming, the air shut-off is designed to simultaneously open or close both the inlet-side air passage 11a and the outlet-side air passage 11b with multiple valve flaps 20.

The valve body 10 comprises a main body 12, at which the valve flaps 20 are rotatably installed and which accounts for the external shape of the valve shut-off apparatus, and a sub-body 13, with which the valve flaps 20 come into contact when the passages are closed by the valve flaps 20 and which is detachably engaged with the main body 12. Additionally, the sub-body 13 is combined with the fuel cell stack 1 in surface-contact.

In some forms, the sub-body 13 may be higher in roughness and hardness than the main body 12.

For weight reduction, the main body 12 may be die-cast from an aluminum alloy while the sub-body 13 may be made of stainless steel, or may be treated by hard anodizing when it is made of aluminum, to guarantee high roughness and hardness.

The sub-body 13 is characterized by higher roughness than that of the main body 12 so as to improve the airtightness (leakproofness) of the passages 11.

Allowed to be in direct contact with the valve flaps 20, the sub-body 13 is one of the most important factors in determining the airtightness of the air passages 11 upon closure with the valve flaps 20. When the sub-body 13, like the main body, is die-cast from an aluminum alloy alone, it is difficult to control the roughness of the air passages 11, and thus the airtightness of the air passages 11 becomes poor. To increase the roughness thereof so as to overcome this disadvantage, the sub-body 13 is made of stainless steel, or is subjected to hard anodizing when die-cast from an aluminum alloy in the present disclosure.

In another form, the sub-body 13 is higher in hardness than the main body 12 so that it can be prevented from being damaged by the valve flaps 20.

In the region of the valve body 10 that is in direct contact with the valve flaps 20 (the region where an air passage is formed), the moisture in the air is apt to freeze during the winter season, causing minute damage to the sub-body 13 upon contact with the valve flaps 20. In some forms, the sub-body 13 is made of stainless steel, or is subjected to hard anodizing when die-cast from an aluminum alloy so that the sub-body 13 has higher hardness than the main body 12.

In another form, the air shut-off valve apparatus may further comprise a valve motor 30, which is installed in the main body 12, a valve shaft 40, which is axially rotatably mounted in the main body 12 and to which a plurality of valve flaps 20 is fixedly engaged, and valve gears 50, through which the valve motor 30 is connected to the valve shaft 40 to transmit power from the valve motor 30 to the valve shaft 40.

Within the main body 12, the valve shaft 40 is mounted outside the air passages 11 so as to avoid causing resistance to the flow of air. The valve flaps 20 are adapted to completely cover ends of respective air passages 11 and thus to render the air passages 11 airtight.

Each of the valve flaps 20 comprises a valve plate 21, which is made of steel or plastic and joined to the valve shaft 40, and a plate cover 22, made of rubber, for covering the valve plate so as to absorb noise and shocks upon contact with the sub-body 13 and to improve airtightness to the air passages 11.

In another form, the air shut-off valve apparatus may further comprise a return spring 60, engaged at one end to the main body 12 and at the other end to the valve shaft 40, for providing rotational torque for the valve shaft 40 to move the valve flaps 20 in such a direction as to close the air passages 11.

Forms of the air shut-off valve apparatus are structured to rotate the valve shaft 40 using the power generated by the valve motor 30, during which the valve flaps 20 are rotated to close/open the air passages. Upon the halt of operation of the fuel cell system (shut down), the valve flaps 20 should not only close the air passages 11, but should also guarantee the airtightness required by the fuel cell system.

When the operation of the fuel cell system is halted, the power supply to the valve motor is shut off, while the air passages 11 are closed by the valve flaps 20. At this time, the elastic plate cover 22, made of rubber, of the valve flap 20 is brought into contact with the sub-body 12, in which the air passages 11 are formed, and a fine gap is formed between the valve flaps 20 and the air passages 11 by the elasticity of the plate cover 22 as the valve flaps 20 operate in the opening direction. Hence, the return spring is provided in accordance with some forms of the present disclosure to prevent a fine gap from forming between the valve flaps 20 and the air passages 11 when the air passages are closed by the valve flaps 20.

The elastic force of the return spring 40 should be greater than the reaction force of the plate cover 22 in the state in which the valve flaps 20 close the air passages 11.

In the state in which the valve flaps 20 open the air passages 11, the elastic force of the return spring 60 acts to push the valve flaps 20. Accordingly, the increased elastic force of the return spring 60 compels the valve motor 30 to consume more power in order to keep the air passages 11 open. This has a bad effect on fuel efficiency because the power consumption of the valve motor 30 increases excessively during the operation of the fuel cell system.

Therefore, the return spring 60 should be designed to have optimal elastic force in consideration both of the elastic force of the plate cover 22, which is made of rubber, and of the power consumption of the valve motor 30.

When the operation of the fuel cell system is halted (shut down), not only is a closing force exerted for the valve flaps 20 to close the air passages 11, but a pressure difference is also created between the inside and outside of the air passages 11 closed by the valve flaps 20. Accordingly, the valve flaps 20 can improve the airtightness of the air passages 11, thereby minimizing leakage.

That is, when the operation of the fuel cell system is halted, the restoring force of the return spring 60 compels the valve flaps 20 to close the air passages 11, and thus acts as the closing force of the valve flaps 20.

In addition, when the operation of the fuel cell system is halted, the pressure of the air passages 11 on the side of the sub-body 13 based on the valve flaps 20 (outer pressure, P1 in FIG. 3) is lower than atmospheric pressure as the air reacts with residual gas in the stack. On the contrary, the pressure on the side of the main body 11 based on the valve flaps 20 (inner pressure, P2 in FIG. 2) is higher than the pressure of the air passages 11 on the side of the sub-body 13 (P1).

Hence, when the operation of the fuel cell system is halted (shut down), the closing force of the valve flaps 20 is generated by the return spring 60 while a pressure difference is created between the inside and the outside on the basis of the valve flaps 20. These two factors enhance the ability of the valve flaps 29 to maintain the airtightness of the air passages 11, thus minimizing leakage.

Also, the plate cover 22 has a cover projection 23 incorporated thereinto, which comes into contact with a bulkhead 13a forming the air passage 11 in the sub-body 13. When the valve flap 20 closes the air passage 11, the cover projection 23 is brought into surface contact with the bulkhead 13a in such a manner as to cover one end of the bulkhead 13a. Thus, there is an overlapping region (Ml) between the cover projection 23 and an end of the bulkhead 13a so as to enhance the airtightness with which the air passage is closed by the valve flap 20.

Figure 6A:
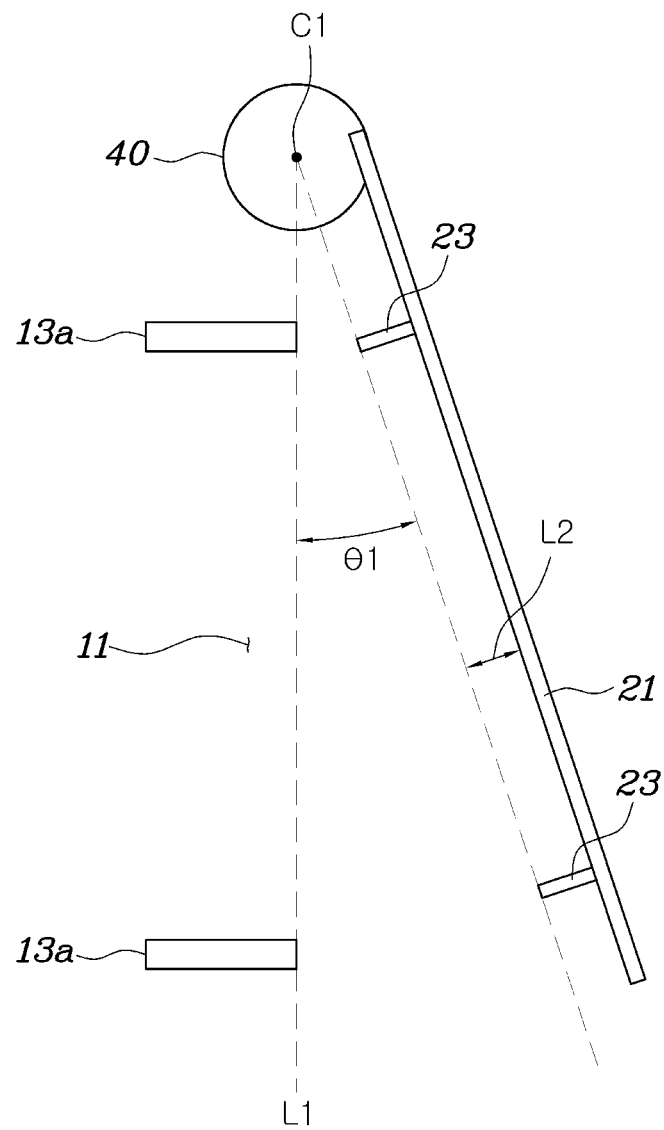
FIGS. 6A and 6B are views illustrating a valve flap eccentrically attached to a valve shaft.
Figure 6B:
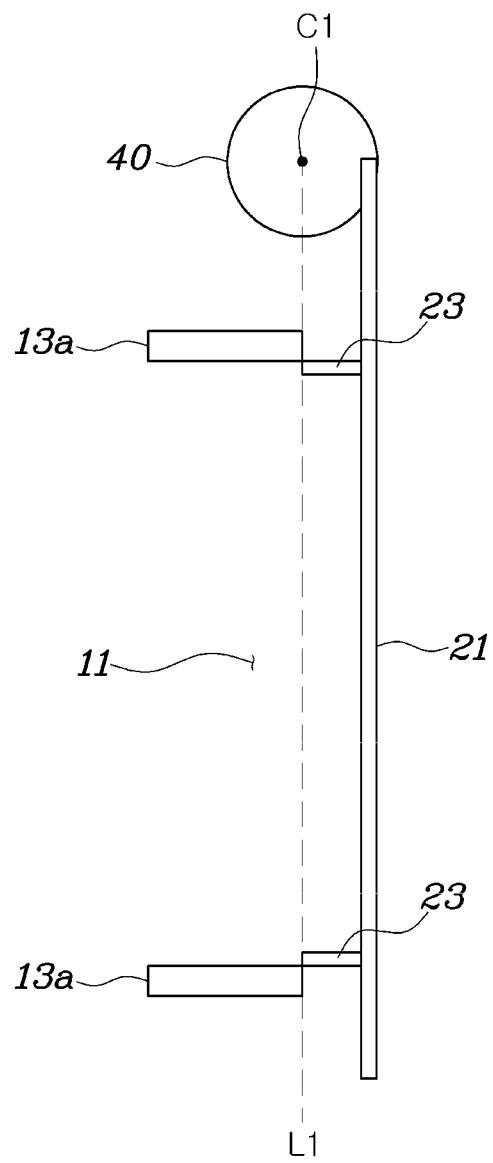

As shown in FIGS. 6A and 6B, the valve shaft 40 is positioned outside the air passages 11 such that the center of rotation (C1) of the valve shaft is aligned with the end line of the bulkhead 13a according to a vertical line (L1). The valve plate 21 is jointed to the valve shaft 40 at a position eccentric to the center of rotation (C1). Thus, the valve flap 20 has a structure that is eccentric to the center of rotation (C1) of the valve shaft 40 by a length equal to the projection length (L2) of the cover projection 23.

Figure 7:
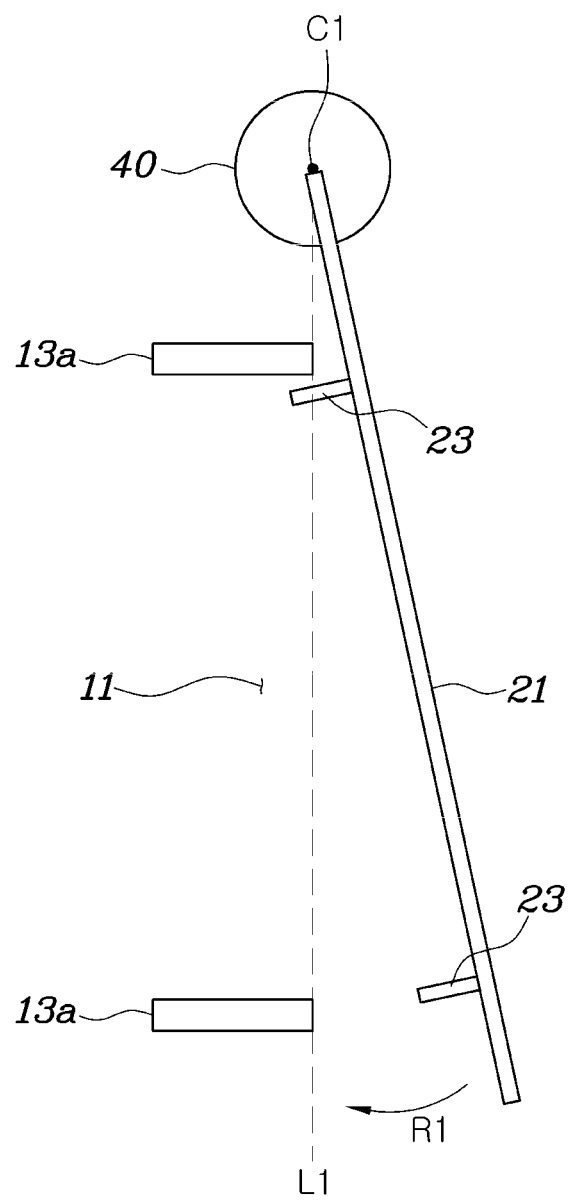
FIG. 7 is a view Illustrating a general engagement structure of a valve flap.

Generally, butterfly-type valves are, for the most part, structured to have the valve plate 21 aligned with the center of rotation (C1) of the valve shaft 40, as shown in FIG. 7. In this case, as the valve flap 20 moves in order to convert the air passage from an open state to a closed state (as indicated by the arrow R1), the cover projection 23 proximal to the center of rotation (C1) is first brought into contact with the bulkhead 13a of the sub-body 13 (upper cover projection in FIG. 7) while the cover projection 23 distal to the center of rotation (C1) remains spaced apart from the bulkhead 13a of the sub-body 13 (lower cover projection).

In order to achieve complete closure of the air passage 11, the lower cover projection 23, which is spaced apart from the bulkhead 13a of the sub-body 13, must be in contact with the bulkhead 13a of the sub-body 13. To this end, the valve motor 30 is required to further operate, and the resistance occurring between the upper cover projection 23 and the bulkhead 13a increases the consumption of power. In severe cases, the valve motor may be damaged by fire.

In contrast, as shown in FIGS. 6A and 6B, the valve flap 20 that is attached to the valve shaft 40 at a position eccentric to the center of rotation (C1) by a length equal to the projection length (L2) of the cover projection 23 in accordance with some embodiments of the present disclosure allows the cover projections 23, whether proximal (upper) or distal (lower) to the center of rotation (C1), to contact the bulkhead 13a of the sub-body 13, at the same time as the valve flap 20 moves to convert the air passage from an open state to a closed state. Thus, the valve motor 30 can be made to consume less power and can be prevented from being damaged by a fire in accordance with some embodiments of the present disclosure.

In a preferred forms, the valve flap 20, when fully opened, forms an acute angle ($\theta 1$) with respect to its closed state.

When maximally opened, the valve flap 20 advantageously forms an acute angle ($\theta 1$) with respect to the vertical line (L1, the closed state of the valve flap) to reduce the resistance to airflow and the final size of the air shut-off valve.

As described hitherto, the air shut-off apparatus according to the present disclosure can achieve complete airtightness of the air passage 11 even though a butterfly-type valve is used, and thus has advantages over a solenoid-type valve in terms of the number of parts, weight, and production cost.

In addition, when the operation of the fuel cell system is halted, the air passage 11, communicating with the cathode 1a, is completely closed by the valve flap 20, which can bring about a great improvement in the durability of the fuel cell stack. Particularly, upon the halt of operation of the fuel cell system, circuit voltages of individual cells can be kept low, whereby the required capacity of the start-up COD (cathode oxygen depletion) can be reduced.

Moreover, the complete closure of the air passage 11 prevents the introduction of foreign matter, thus enhancing the durability of the fuel cell system.

Although preferred forms of the present disclosure have been disclosed for illustrative purposes, those skilled in the art will appreciate that various modifications, additions and substitutions are possible, without departing from the scope and spirit of the invention as disclosed in the accompanying claims.

What is claimed is:

1. An air shut-off valve apparatus for a fuel cell system, comprising:
   a valve body in which an air passage communicates with a cathode of a fuel cell stack, wherein the valve body comprises:
   a main body configured to define an external shape of the air shut-off apparatus;
   a sub-body combined with the fuel cell stack in surface-contact; and
   a valve shaft axially rotatably installed at a position outside the air passage;
   a valve flap, rotatably installed at the main body such that the valve flap is configured to contact the sub-body to close the air passage by the valve flap and disengage contact with the sub-body to open the air passage by the valve flap, wherein the valve flap is attached to the valve shaft at a position eccentric to a center of rotation of the valve shaft, and wherein the valve flap comprises:
   a valve plate joined to the valve shaft; and
   a plate cover configured to cover the valve plate, the plate cover including a cover projection configured to contact a bulkhead of the sub-body forming the air passage, wherein the cover projection is configured to be in surface contact with the bulkhead to cover an end of the bulkhead and create an overlapping region between the cover projection and the end of the bulkhead to enhance an airtightness of the air passage by the valve flap.

2. The air shut-off valve apparatus of claim 1, wherein the sub-body has a higher hardness than the main body.

3. The air shut-off valve apparatus of claim 1, wherein the main body is made of an aluminum die-cast alloy, and the sub-body is made of stainless steel or is treated by hard anodizing when it is made of aluminum.

4. The air shut-off valve apparatus of claim 1, wherein,
the air passage is divided into an inlet-side air passage and an outlet-side air passage, both the inlet- and the outlet-side air passages being formed in one valve body; and
a plurality of the valve flaps is provided to cover the inlet-side air passage and the outlet-side air passage, respectively, and is structured to open/close the inlet-side air passage and the outlet-side air passage at the same time.

5. The air shut-off valve apparatus of claim 1, further comprising:
a valve motor installed in the main body; and
valve gears through which the valve motor is connected to the valve shaft to transmit power of the valve motor to the valve shaft, wherein the valve shaft is axially rotatably mounted in the main body.

6. The air shut-off valve apparatus of claim 1, wherein the valve flap is adapted to completely cover an end of the air passage, whereby the air passage is rendered airtight.

7. The air shut-off valve apparatus of claim 1, wherein the plate cover is made of rubber so as to absorb noise and shocks upon contact with the sub-body and to improve airtightness of the air passage.

8. The air shut-off valve apparatus of claim 1, further comprising a return spring, engaged at one end to the main body and at a remaining end to the valve shaft, for providing rotational torque for the valve shaft to move the valve flap in such a direction as to close the air passage.

9. The air shut-off valve apparatus of claim 1, wherein
the valve shaft is positioned such that a center of rotation of the valve shaft is aligned with an end line of the bulkhead along a vertical line; and
the valve plate is attached to the valve shaft at a position eccentric to the center of rotation.

10. The air shut-off valve apparatus of claim 1, wherein the valve flap is eccentric to the center of rotation of the valve shaft by by a length equal to the projection length of the cover projection 23.

11. The air shut-off valve apparatus of claim 1, wherein the valve flap, when fully opened, forms an acute angle with respect to a closed state thereof.

12. The air shut-off valve apparatus of claim 1, wherein, upon halt of operation of the fuel cell system, a closing force is exerted for the valve flap to close the air passage, and simultaneously, a pressure difference is created between an inside and an outside of the air passage, which is closed by the valve flap.

\* \* \* \* \*